(12) United States Patent
Baek et al.

(10) Patent No.: US 6,580,480 B2
(45) Date of Patent: Jun. 17, 2003

(54) TRANSFLECTIVE LIQUID CRYSTAL DISPLAY DEVICE AND MANUFACTURING METHOD THEREOF

(75) Inventors: Heum-Il Baek, Seoul (KR); Kyoung-Su Ha, Seoul (KR); Yong-Beom Kim, Suwon-shi (KR); Dong-Guk Kim, Kumpo-shi (KR)

(73) Assignee: LG. Phillips LCD Co., Ltd., Seoul (KR)

( * ) Notice: Subject to any disclaimer, the term of this patent is extended or adjusted under 35 U.S.C. 154(b) by 89 days.

(21) Appl. No.: 09/891,505

(22) Filed: Jun. 27, 2001

(65) Prior Publication Data

US 2002/0036730 A1 Mar. 28, 2002

(Under 37 CFR 1.47)

(30) Foreign Application Priority Data

Jul. 4, 2000 (KR) ........................................ 2000-38076

(51) Int. Cl.[7] ............................................. G02F 1/1336
(52) U.S. Cl. ........................................ 349/114; 349/113
(58) Field of Search ................................. 349/113, 114, 349/106, 107

(56) References Cited

U.S. PATENT DOCUMENTS 6,366,333 B1 * 4/2002 Yamamoto et al. .......... 349/113
6,476,889 B2 * 11/2002 Urabe et al. ................. 349/106
6,476,890 B1 * 11/2002 Funahata et al. ........... 349/113

* cited by examiner

*Primary Examiner*—James Dudek
(74) *Attorney, Agent, or Firm*—Morgan, Lewis & Bockius LLP (57) ABSTRACT

The present invention discloses a transflective liquid crystal display (LCD) device that is used in both a transmissive mode and a reflective mode. The transflective LCD device includes a first substrate, a second substrate, a liquid crystal layer disposed between the first substrate and the second substrate, a passivation layer having a plurality of convex portions formed on a first surface portion of the second substrate, and a color filter layer formed on a second surface portion of the second substrate and on the passivation layer.

24 Claims, 7 Drawing Sheets

FIG. 1

BACKGROUND ART

TRANSFLECTIVE LIQUID CRYSTAL DISPLAY DEVICE AND MANUFACTURING METHOD THEREOF

This application claims the benefit of Korean Patent Application No. 2000-38076, filed on Jul. 4, 2000 in Korea, which is hereby incorporated by reference.

BACKGROUND OF THE INVENTION

1. Field of the Invention

The present invention relates to a liquid crystal display device, and more particularly, to a transflective liquid crystal display (LCD) device having a color filter substrate and manufacturing method thereof.

2. Discussion of the Related Art

Generally, typical thin film transistor liquid crystal display (TFT-LCD) devices include an upper substrate and a lower substrate with liquid crystal molecules interposed therebetween. The upper substrate and the lower substrate are generally referred to as a color filter substrate and an array substrate, respectively. The upper substrate and the lower substrate respectively include electrodes disposed on opposing surfaces of the upper substrate and the lower substrate. An electric field is generated by applying a voltage to the electrodes, thereby driving the liquid crystal molecules to display images depending on light transmittance.

In accordance with the application of an internal or external light source, LCD devices are commonly classified into two categories: a transmission type and a reflection type. The transmission type LCD has a liquid crystal display panel that does not emit light, and therefore, a backlight is provided to function as a light-illuminating source. The backlight is disposed at a first or rear side of the panel, and light emitted from the backlight passes through the liquid crystal panel to be controlled by the liquid crystal panel, thereby displaying an image. That is, the liquid crystal panel display forms an image according to an arrangement of the liquid crystal molecules which transmit or interupt light emitted from the backlight. However, the backlight of the transmission type LCD consumes 50% or more of the total power consumed by the LCD device. Accordingly, the use of the backlight increases power consumption of the LCD device.

To reduce power consumption, reflection type LCD devices have been developed for portable information apparatuses that are often used outdoors or carried along with users. Such reflection type LCD devices are provided with a reflector formed on one of a pair of substrates, and ambient light is reflected from the surface of the reflector. However, visibility of the display of reflection type LCD devices is extremely poor when the surrounding environment is dark and no ambient light is available.

In order to overcome the above problems, a transflective liquid crystal display device has been proposed that utilizes both a transmissive mode display and a reflective mode display in a single liquid crystal display device. The transflective liquid crystal display (LCD) device alternatively acts as a transmissive LCD device and a reflective LCD device by making use of both internal and external light sources, thereby providing operation with low power consumption in good ambient light conditions.

Figure 1:
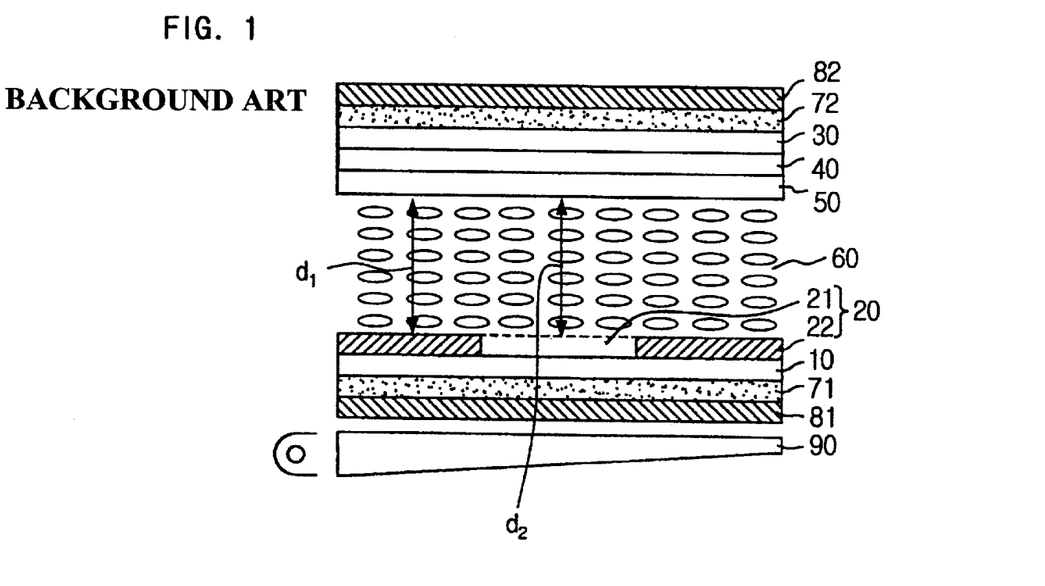
FIG. 1 is a schematic cross-sectional view of a typical transflective LCD device and shows a layer structure of the typical transflective LCD device.

FIG. 1 is a schematic cross-sectional view showing a layer structure of a typical transflective LCD device. As shown, the transflective LCD device includes an upper substrate 30 and a lower substrates 10 and a horizontally oriented liquid crystal layer 60 interposed therebetween. The lower substrate 10 has a thin film transistor (TFT) (not shown) and a pixel electrode 20 disposed on the surface facing the upper substrate 30. The pixel electrode 20 includes reflective electrode portion 22 and a transparent electrode portion 21 disposed in an opening therebetween. The transparent electrode 21 is formed of ITO (indium-tin-oxide) or IZO (indium-zinc-oxide), and the reflective electrode 22 is made of aluminum (Al) having low electrical resistance and superior light reflectivity.

In FIG. 1, the upper substrate 30 includes a color filter 40 formed on the surface facing the lower substrate 10 corresponding to the pixel electrode 20, and a common electrode 50 formed on the color filter 40. Furthermore, a first retardation film 71 and a second retardation film 72 are formed on outer surfaces of the lower substrate 10 and the upper substrate 30, respectively. The first retardation film 71 and the second retardation film 72 are quarter wave plates ("QWP"s). The first QWP 71 and the second QWP 72 change a polarization state of light transmitted through the liquid crystal layer 60. Specifically, the first QWP 71 and the second QWP 72 convert linearly polarized light into right- or left-handed circularly polarized light, and conversely convert right- or left-handed circularly polarized light into linearly polarized light. A lower polarizer 81 and an upper polarizer 82 are formed on each outer surface of the first QWP 71 and the second QWP 72, respectively. Accordingly, a transmissive axis of the upper polarizer 82 makes an angle of 90 degrees with a transmissive axis of the lower polarizer 81. Furthermore, a backlight device 90 is disposed adjacent to the lower polarizer 81 and functions as a light source in the transmissive mode.

Figure 2:
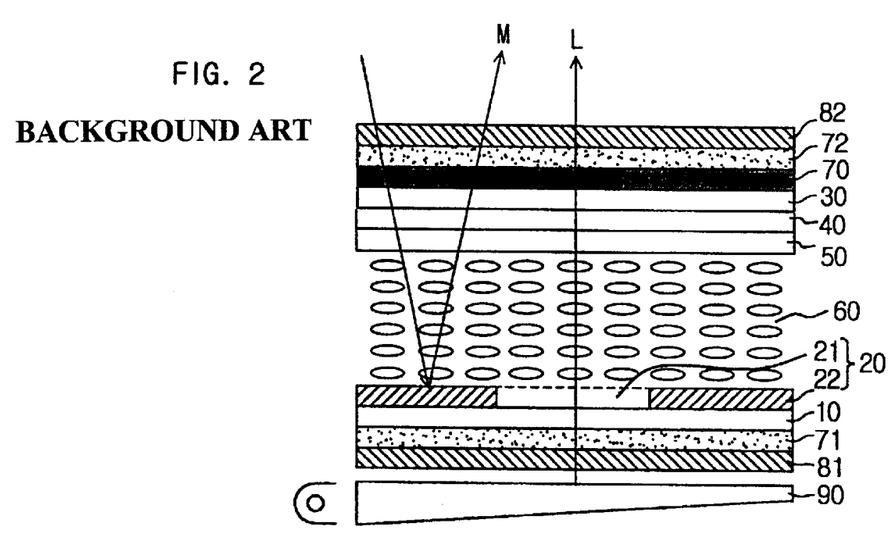
FIG. 2 shows the operating principles of the transflective liquid crystal display device shown in FIG. 1.

FIG. 2 shows operating principles of the transflective liquid crystal display device shown in FIG. 1. The transflective LCD device depicted in FIG. 2 includes a dispersion film 70 formed between the upper substrate 30 and the second QWP 72 to disperse the incident light (light "L" from the backlight device 90 and light "M" from the surroundings) and, thereby widens the viewing angle.

In FIG. 2, the light "L" generated from the backlight device 90 passes through the lower polarizer 81 and other elements on the lower substrate 10, through the liquid crystal layer 60, and through the upper polarizer 82. Concurrently, ambient light "M" passes through the upper polarizer 82 and other elements on the upper substrate 30, and then, through the liquid crystal layer 60. Then, the ambient light "M" is reflected onto a surface of the reflective electrode 22 and is redirected up toward the upper substrate 30, and passes back through the upper polarizer 82. At this time, the liquid crystal layer 60 has an optical retardation (defined by (d·Δn) hereinafter) λ/4 (at λ=550 nm).

In the above transflective liquid crystal display device, a normally white mode is adopted. Accordingly, the transflective device displays a white color when a signal is not applied. However, only about 50% of the light generated from the backlight device 90 can pass through the upper polarizer 82 in the transmissive mode of the transflective LCD device. Accordingly, a dark gray color is produced due to the transflective LCD device operating in the reflective mode, and also because a first cell gap "$d_1$" (in FIG. 1) of the reflective portion is substantially equal to a second cell gap "$d_2$" (in FIG. 1) of the transmitting portion.

In FIG. 2, a color purity of the light passing through the color filter 40 is dependent upon a thickness of the color filter 40. Accordingly, increasing a thickness of the color filter 40 improves the color purity of the light passing through the color filter 40. In the transflective liquid crystal display device shown in FIG. 2, the ambient light "M" passes through the color filter 40 twice due to the reflection on the reflective electrode 22, while the light "L" from the backlight device 90 passes through the color filter 40 just once. Therefore, there is a difference in color purity produced by the LCD device when operated in the transmissive mode versus operation in the reflective mode.

Furthermore, during operation of the transflective LCD device in the reflective mode, display images can only be seen in a projection direction and not in an incident direction because the ambient light "M" from the outside is reflected from the reflective electrode 22. To overcome this problem, the light dispersion film 70 is formed on the upper substrate 30. As a result, the manufacturing cost is raised and deterioration of display image brightness is increased in the transmissive mode.

SUMMARY OF THE INVENTION

Accordingly, the present invention is directed to a transflective liquid crystal display device and manufacturing method thereof that substantially obviates one or more of problems due to limitations and disadvantages of the related art.

An object of the present invention is to provide a transflective liquid crystal display device and a manufacturing method thereof that increases brightness.

Another object of the present invention is to provide a transflective liquid crystal display device and a manufacturing method thereof that has uniform color purity in both the transmissive mode and reflective mode.

A further object of the present invention is to provide a method of manufacturing a color filter substrate that decreases manufacturing costs.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display (LCD) device includes a first substrate, a second substrate, a liquid crystal layer disposed between the first substrate and the second substrate, a passivation layer having a plurality of convex portions formed on a first surface portion of the second substrate, and a color filter layer formed on a second surface portion of the second substrate and on the passivation layer.

In another aspect of the present invention, a method of forming a color filter substrate for use in a transflective liquid crystal display (LCD) device includes the steps of forming a passivation layer on a first portion of a substrate, the passivation layer having different refraction characteristic portions, and forming a color filter layer on a second portion of the substrate and the passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 3:
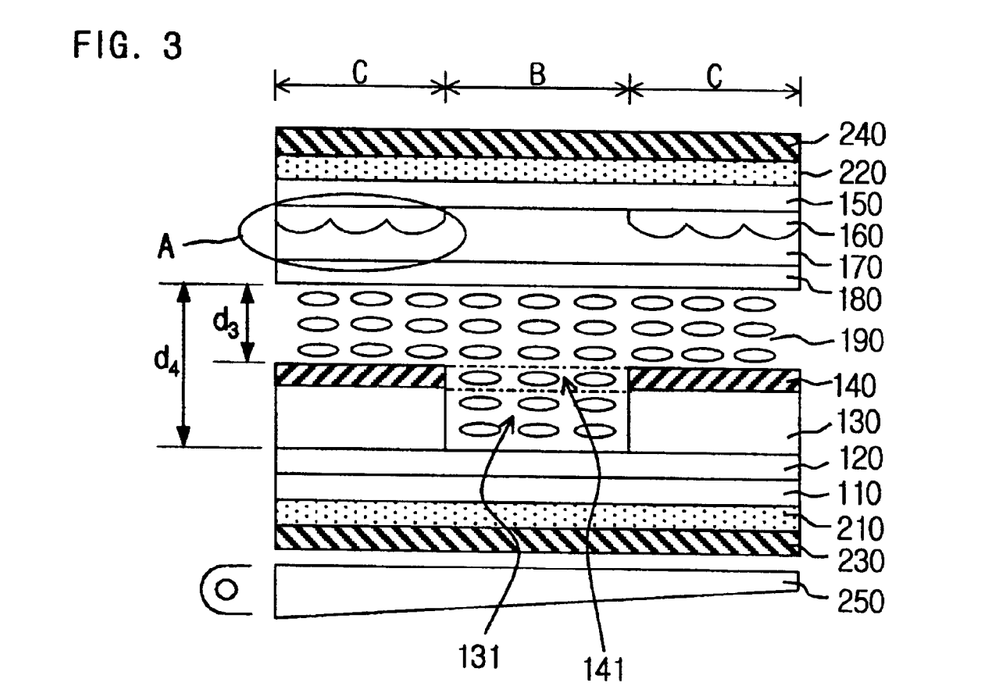
FIG. 3 is a schematic cross-sectional view of a transflective LCD device according to an embodiment of the present invention.

FIG. 3 is a schematic cross-sectional view of a transflective LCD device according to the present invention. As shown, the transflective LCD device is divided into a transmitting portion "B" and a reflective portion "C," and includes an upper substrate 150 and a lower substrates 110 with a liquid crystal layer 190 interposed therebetween. The lower substrate 110 includes a thin film transistor (not shown) and a transparent electrode 120 disposed on the surface facing the upper substrate 150. An insulation layer 130 and a reflective electrode 140 are successively formed upon the transparent electrode 120. In the transflective LCD device, the transparent electrode 120 includes an indium-tin-oxide (ITO) or indium-zinc-oxide (IZO) material, the insulation layer 130 includes an inorganic substance, such as silicon nitride ($SiN_x$) or silicon oxide ($SiO_x$), or an organic substance, such as BCB (benzocyclobutene) or acryl-based resin, and the reflective electrode includes aluminum (Al) or an Al-alloy material. The insulation layer 130 and the reflective electrode 140 correspond to transmitting holes 131 and 141, respectively, that penetrate both the insulation layer 130 and the reflective electrode 140. As a result, a corresponding portion of the transparent electrode 120 is exposed by the transmitting holes 131 and 141. The transmitting holes 131 and 141 can be shaped like a quadrilateral, circle or oval. Although not shown in FIG. 3, the reflective electrode 140 is electrically connected with the transparent electrode 120 to function as a pixel electrode, and alternatively, the insulation layer 130 can be omitted.

In FIG. 3, the lower substrate 110, a lower quarter wave plate (QWP) 210 and a lower polarizer 230 are successively formed on the transparent electrode 120 opposite from the side of the lower substrate 110 where the insulation layer 130 is formed. The lower QWP 210 converts linearly polarized light into right- or left-handed circularly polarized light, and conversely, converts right- or left-handed circularly polarized light into linearly polarized light. Moreover, a backlight device 250, which functions as a light source in the transmissive mode, is arranged adjacent to the lower polarizer 230.

In FIG. 3, the upper substrate 150 includes a passivation layer 160 on the surface facing the lower substrate 110 and is formed within the reflective portion "C," thereby functioning as a dispersion film due to a plurality of convex portions formed upon a surface thereof. A color filter layer 170 is formed on the upper substrate 150 to cover the passivation layer 160 and has different thicknesses formed within the transmitting portion "B" and the reflective portion "C." Specifically, the color filter layer 170 in the transmitting portion "B" has a thickness greater than a thickness in the reflective portion "C." Accordingly, although surrounding ambient light passes twice through the color filter layer 170, differences in color purity can be prevented. As previously described, because the color purity is dependent upon the thickness of the color filter layer 170, artificial light produced from the backlight device 250 passes just once through the thicker part of the color filter layer 170 and ambient light passes twice through the thinner part of the color filter 170. Therefore, both the artificial light and the ambient light travel the same distance through the color filter 170, thereby maintaining uniform color purity.

In the structure shown in FIG. 3, the thickness of the color filter layer 170 in the transmitting portion "B" is substantially twice as large as the thickness of the color filter layer 170 in the reflective portion "C." Furthermore, the passivation layer 160 is about half as thick as the color filter layer 170 in the transmitting portion "B." A common electrode 180 made of a transparent conductive material such as ITO or IZO, for example, is disposed upon the color filter layer 170.

In FIG. 3, in the case when the interposed liquid crystal layer 190 has an optical retardation "d·Δn" of λ/4 (at λ=550 nm), the liquid crystal layer 190 in the transmitting portion "B" is twice as thick as the thickness of the liquid crystal layer 190 in the reflective portion "C," thereby preventing a decrease of brightness in the transmissive mode. Additionally, a first cell gap "$d_3$" is defined in the interval between the reflective electrode 140 and the common electrode 180, i.e., a reflective portion "C," and a second cell gap "$d_4$" is defined in the interval between the transparent electrode 120 and the common electrode 180, i.e., a transmitting portion "B." As shown in FIG. 3, since the insulation layer 130 is selectively formed to create a difference between the cell gaps "$d_3$" and "$d_4$," the thickness of the liquid crystal layer 190, i.e., the cell gaps, is different. Specifically, the second cell gap "$d_4$" is twice as long as the first cell gap "$d_3$" (i.e., $d_4=2d_3$). Furthermore, the thickness of both the insulation layer 130 and reflective electrode 140 is the same as that of the first cell gap "$d_3$" of the liquid crystal layer 190 in the reflective portion "C." Additionally, an upper quarter wave plate (QWP) 220 and an upper polarizer 240 are successively formed on another surface of the upper substrate 150 opposite to the surface adjacent to the liquid crystal layer 190. The transmissive axis of the upper polarizer 240 makes an angle of 90 degrees with that of the lower polarizer 230.

Figure 4:
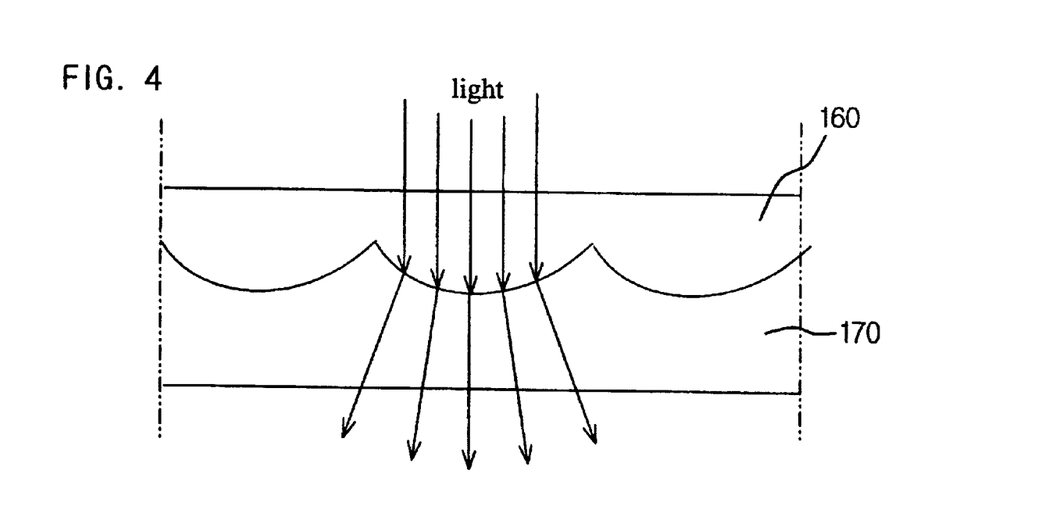
FIG. 4 is an enlarged sectional view of a portion "A" of FIG. 3.

FIG. 4 is an enlarged sectional view of a portion "A" of FIG. 3. In FIG. 4, the passivation layer 160 has a plurality of convex portions that function as a dispersion film, such that the passivation layer 160 refracts the ambient light. Accordingly, although the ambient light enters the passivation layer 160 in one direction, the ambient light is refracted and dispersed in other directions due to a difference in refraction indices between the passivation layer 160 and the color filter layer 170. As a result, a wide viewing angle is obtained without forming an additional dispersion film and thus, thereby achieving reduced manufacturing costs.

Figure 5A:
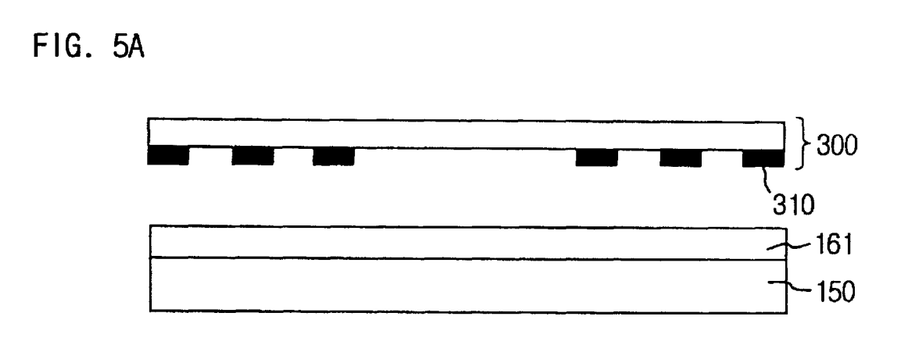
FIGS. 5A to 5C are cross-sectional views showing a manufacturing process of a passivation layer according to the present invention.
Figure 5B:
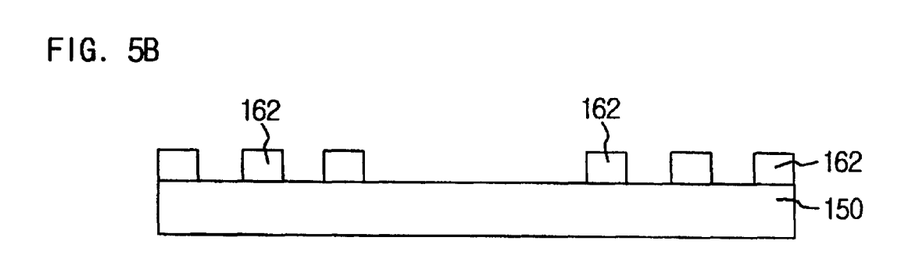
Figure 5C:
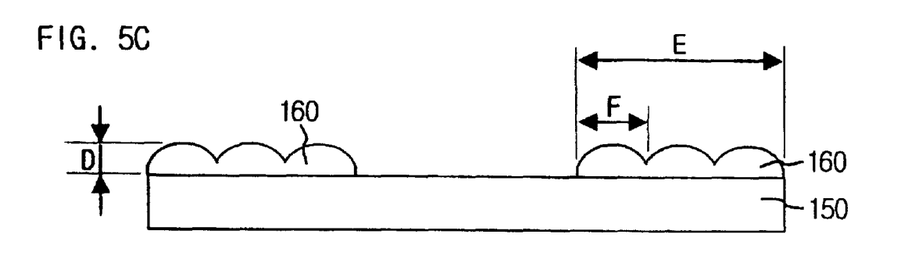

FIGS. 5A to 5C are cross-sectional views showing a manufacturing process of a passivation layer according to the present invention.

In FIG. 5A, a transparent resin 161 having a thermoplastic characteristic is deposited upon the substrate 150 and then, an exposure process is performed using a photo mask 300. The photo mask 300 includes a plurality of light-shielding patterns 310 formed in a portion corresponding to the reflective electrode 140 (in FIG. 3).

In FIG. 5B, portions of the transparent resin 161 of FIG. 5A that are exposed by light are subsequently removed to form a plurality of transparent resin patterns 162 in a position corresponding to the reflective electrode 140 of FIG. 3. A positive photosensitive material may be used as the transparent resin 161. Accordingly, the portions of the positive photosensitive material absorb light energy in the exposure process and are removed during a subsequent developing process. Alternatively, a negative photosensitive material may be used as the transparent resin 161.

In FIG. 5C, the upper substrate 150 that now has a plurality of the transparent resin patterns 162 of FIG. 5B is thermal-treated. During the thermal treatment, the transparent resin patterns 162 melt to form the passivation layer 160 having a plurality of convex portions. Accordingly, as shown in FIG. 3, since a portion of the color filter layer 170 has a thickness of about 2 to 3 micrometers in the transmitting portion "B," a corresponding portion of the passivation layer 160 in the reflective portion "C" has a thickness "D" of about 1 to 2 micrometers in order to create a difference in thickness of the color filter layer 170 between in the transmitting portion "B" and in the reflective portion "C." Moreover, with respect to FIG. 3, in the case where a width of a unit pixel is about 100 micrometers, a width of a portion of the reflective electrode 140 disposed adjacent to both sides of the transmitting hole 141 is about 30 micrometers. Therefore, since the passivation layer 160 has a direct correspondence with the reflective electrode 140, a width "E" of the passivation layer 160 is about 30 micrometers.

Additionally, with respect to the passivation layer 160 having the thickness "D" and width "E", if one convex portion of the passivation layer 160 has a width "F" greater than about 20 micrometers, the corresponding curvature of the convex portion is relatively small and a total number of convex portions is decreased, thereby reducing the dispersion effect. Furthermore, the width "F" of one convex portion should be more than about 4 micrometers to achieve a uniform dispersion without a chromatic aberration in the visible wavelength (about 400 to 800 nm) of light. Accordingly, the width of the convex portion "F" ranges from about 4 to 20 micrometers.

Furthermore, to achieve a dispersion effect it is preferred that there be a difference in refraction index between the color filter 170 and the passivation layer 160. If the passivation layer 160 and the color filter 170 do not have the different refraction indexes, the dispersion does not occur. Therefore, the difference in refraction index between the passivation layer 160 and the color filter 170 should be more than about 0.3.

In the configuration of FIGS. 5A to 5C, the passivation layer is formed by patterning and thermal-treating a thermoplastic transparent resin. However, it is possible to form the passivation layer 160 only using exposure and developing processes.

Figure 6A:
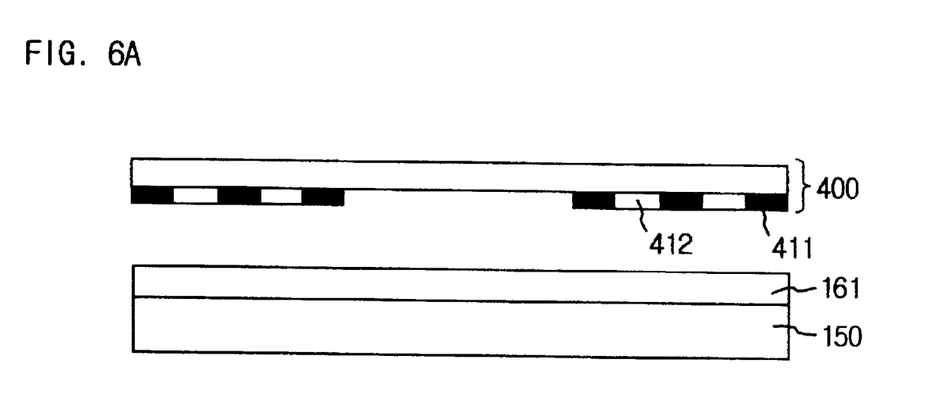
FIGS. 6A and 6B are cross-sectional views showing a manufacturing process of another passivation layer according to the present invention.
Figure 6B:
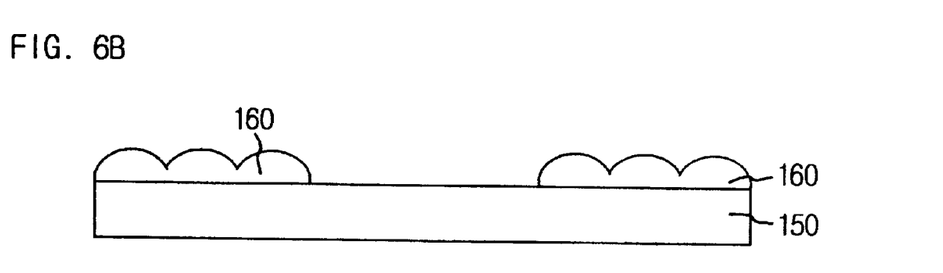

FIGS. 6A and 6B are cross-sectional views showing a manufacturing process of another passivation layer according to the present invention.

In FIG. 6A, a transparent resin 161 is deposited upon the substrate 150. Subsequently, an exposure process is performed using a photo mask 400 that is divided into first, second and third portion. The first portion corresponds to the transmitting portion "B" (in FIG. 3) of the transflective LCD device and transmits light. The second portion has a plurality of light-shielding patterns 411 that mask the transparent resin 161 from being exposed by the light during an exposure process. The third portion has a plurality of light-transmitting patterns 412 that transmit a portion of the light during the exposure process. Furthermore, the second portion and the third portion of the mask 400 correspond to the reflective portion "C" (in FIG. 3) of the transflective LCD device. In FIG. 6A, the light-transmitting patterns 412 can be a plurality of slits or, alternatively include certain patterns of molybdenum silicide (MoSi) in halftone, i.e., semitransparent patterns. Therefore, the transparent resin 161 may have photosensitive and thermoplastic characteristics. However, if the transparent resin 161 is not a photosensitive substance, a photoresist is formed on the transparent resin 161 and then etched. Accordingly, an additional etch process is required after the exposure and developing processes.

In FIG. 6B, after the developing process, a portion of the transparent resin 161 corresponding to the transmitting portion "B" (in FIG. 3) is removed, and a portion of the transparent resin 161 corresponding to the reflective portion "C" (in FIG. 3) becomes the passivation layer 160 having a plurality of convex portions. Therefore, in contrast with the passivation layer of FIGS. 5A to 5C, the thermal treatment is not required.

Figure 7:
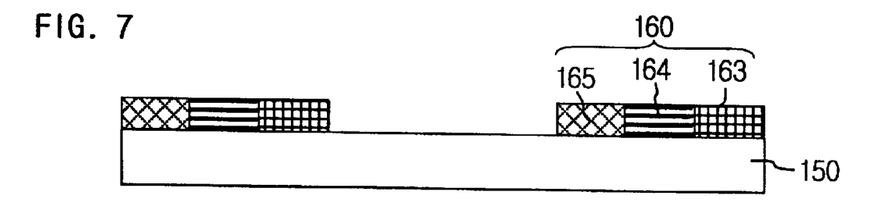
FIG. 7 is a cross-sectional view showing another passivation layer and an upper substrate according to the present invention.

FIG. 7 is a cross-sectional view showing a passivation layer and an upper substrate according to the present invention.

In FIG. 7, a flat passivation layer that includes a plurality of photo-polymeric materials 163, 164 and 165 is formed on the upper substrate 150. The photo-polymeric materials 163, 164 and 165 have variable refraction indices according to an intensity of the irradiated light and are used in forming volume holograms. Accordingly, since each photo-polymeric material 163, 164 and 165 has a different refraction index, light is dispersed much like a plurality of convex portions.

In FIGS. 5C and 6B, the passivation layer 160 includes a plurality of convex portions. However, if the passivation layer does not have a different refraction index from the color filter, formation of an over-coating layer disposed over the passivation layer is desired to create a difference in refraction indices between the passivation layer and the color filter.

FIGS. 8A to 8D are cross-sectional views showing an upper substrate having an over-coating layer disposed on another passivation layer according to the present invention.

Figure 8A:
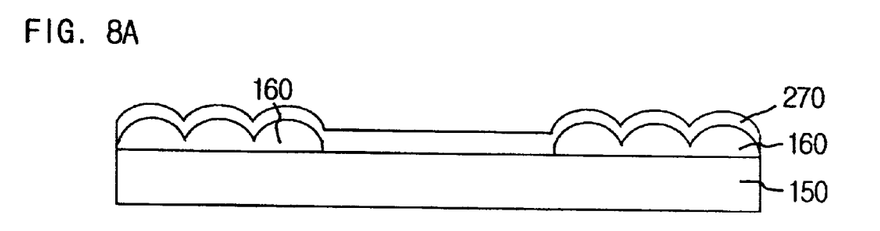
FIGS. 8A to 8D are cross-sectional views respectively showing an upper substrate having an over-coating layer formed on another passivation layer according to the present invention.
Figure 8B:
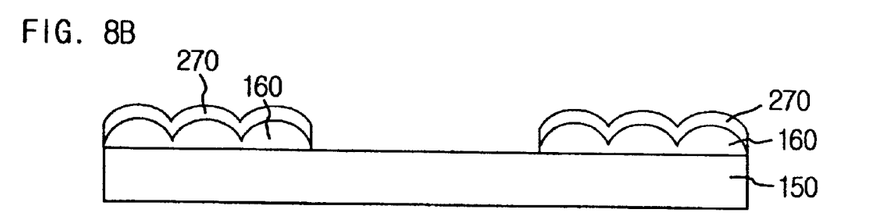

In FIG. 8A, an inorganic material, for example silicon nitride ($SiN_x$), is deposited using a sputtering process, for example, to form an over-coating layer 270 disposed on the substrate 150 to cover the passivation layer 160. As shown, a portion of the over-coating layer 270 corresponding to the transmitting portion "B" (in FIG. 3) has a planar surface, and another portion of the over-coating layer 270 corresponding to the reflective portion "C" (in FIG. 3) has a plurality of convex portions corresponding to the convex portions of the passivation layer 160. By controlling a thickness of the over-coating layer 270, a thickness of the color filter layer 170 (in FIG. 3) that is formed on the passivation layer can be adjusted. Meanwhile, the portion of the over-coating layer 270 that corresponds to the transmitting portion "B" (in FIG. 3) can be removed as shown in FIG. 8B, to create a difference in thickness of a portion of the color filter layer 170 (in FIG. 3) disposed between the transmitting portion "B" and the reflective portion "C."

Figure 8C:
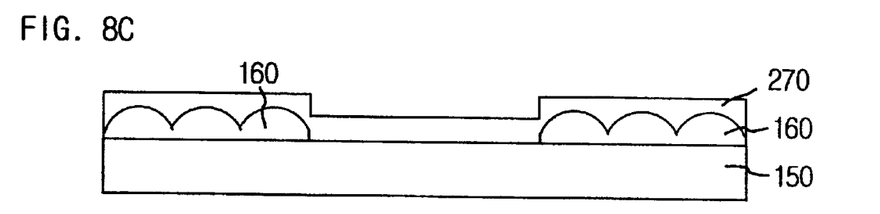
Figure 8D:
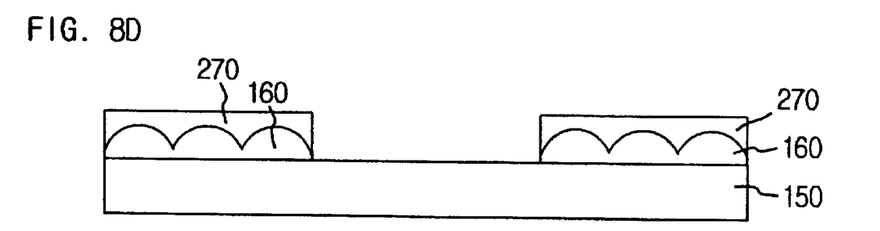

In FIGS. 8C and 8D, the over-coating layer 270 can have a planar surface disposed over the passivation layer 160 when an organic material is used for forming the over-coating layer 270. In FIG. 8D, a portion of the over-coating layer 270 that corresponds to the transmitting portion "B" (in FIG. 3) can be removed to create a difference in thickness of a portion of the color filter layer 170 (in FIG. 3) disposed between the transmitting portion "B" and the reflective portion "C."

As described above, since the passivation layer has a plurality of convex portions, the additional dispersion film formed upon the upper substrate is not required. Furthermore, since incident light is dispersed by the passivation layer, a wide viewing angle is obtained in the reflective mode of the transflective LCD device and manufacturing costs are reduced. Even further, since the color filter and the liquid crystal layer have respective portions with different thicknesses disposed between the transmitting portion and the reflective portion, the brightness increases in the reflective mode and uniform color purity is achieved regardless of the transmissive mode or reflective mode.

It will be apparent to those skilled in the art that various modification and variations can be made in the capacitor and the manufacturing method thereof of the present invention without departing from the spirit or scope of the inventions. Thus, it is intended that the present invention cover the modifications and variations of this invention provided they come within the scope of the appended claims and their equivalents.

What is claimed is:

1. A transflective liquid crystal display (LCD) device, comprising:
   a first substrate;
   a second substrate;
   a liquid crystal layer disposed between the first substrate and the second substrate;
   a passivation layer having a plurality of convex portions formed on a first surface portion of the second substrate; and
   a color filter layer formed on a second surface portion of the second substrate and on the passivation layer.

2. The transflective liquid crystal display device according to claim 1, wherein the color filter layer includes a first portion having a first thickness and a second portion having a second thickness different from the first thickness.

3. The transflective LCD device according to claim 2, wherein the first portion and the second portion of the color filter layer are aligned to the first surface portion and the second surface portion of the second substrate, respectively.

4. The transflective LCD device according to claim 2, wherein the second thickness of the second portion of the color filter layer is greater than the first thickness of the first portion of the color filter layer.

5. The transflective liquid crystal display device according to claim 1, further comprising:

a first electrode disposed on the first substrate; and a second electrode disposed on the color filter layer.

6. The transflective LCD device according to claim 1, wherein the first electrode has reflective portions and transmissive portions.

7. The transflective LCD device according to claim 6, wherein the reflective portions and the transmissive portions of the first electrode are aligned to the first surface portions and the second surface portions of the second substrate, respectively.

8. The transflective LCD device according to claim 6, wherein the reflective portions and transmissive portions of the first electrode are reflective electrodes and transparent electrodes, respectively.

9. The transflective LCD device according to claim 1, wherein each convex portion has a thickness in a ranges from about 1 to 2 micrometers.

10. The transflective LCD device according to claim 1, wherein each convex portion has a width in a range from about 4 to 20 micrometers.

11. The transflective LCD device according to claim 1, wherein the passivation layer is formed of at least a transparent resin material having thermoplastic characteristics.

12. The transflective LCD device according to claim 1, wherein the passivation layer is at least one of a negative photo-sensitive material and a positive photo-sensitive material.

13. The transflective LCD device according to claim 1, further comprising: an over-coating layer formed between the second substrate and the color filter layer to cover the passivation layer.

14. The transflective LCD device according to claim 13, wherein the over-coating layer is made of at least one of an organic material and an inorganic material.

15. The transflective LCD device according to claim 14, wherein the inorganic material is silicon nitride.

16. The transflective LCD device according to claim 13, wherein the over-coating layer is formed only on the passivation layer.

17. The transflective LCD device according to claim 1, wherein the passivation layer includes a plurality of photopolymeric materials.

18. The transflective LCD device according to claim 6, wherein the liquid crystal layer has a first cell gap disposed between the reflective portions of the first electrode and the second electrode, and a second cell gap disposed between the transmissive portions of the first electrode and the second electrode.

19. The transflective LCD device according to claim 18, wherein the second cell gap is larger than the first cell gap.

20. A method of forming a color filter substrate for use in a transflective liquid crystal display (LCD) device, comprising the steps of:

forming a passivation layer on a first portion of a substrate, the passivation layer having different refraction characteristic portions; and forming a color filter layer on a second portion of the substrate and the passivation layer.

21. The method according to claim 20, wherein the step of forming the passivation layer includes:

depositing a transparent resin on the substrate, the transparent resin having a thermoplastic characteristic;

exposing the transparent resin using a mask;

patterning the transparent resin so as to form a plurality of transparent resin patterns; and thermal-treating the transparent resin patterns to form a plurality of convex portions.

22. The method according to claim 20, wherein the step of forming the passivation layer includes:

depositing a transparent resin on the substrate;

exposing the transparent resin using a mask that has three different portions, the first portion having a transparent characteristic, the second portion having a light-shielding characteristic, and the third portion having a semitransparent characteristic; and developing and patterning the transparent resin to form a plurality of convex portions.

23. The method according to claim 22, wherein the transparent resin has a photosensitive characteristic.

24. The method according to claim 20, further comprising the step of forming an over-coating layer between the passivation layer and the color filter layer.

* * * * *